United States Patent [19]

Zehren

[11] 4,128,735
[45] Dec. 5, 1978

[54] ATTACHMENT OF ELECTRIC CABLE TO SUBMERGIBLE PUMP MOTOR HEADS

[75] Inventor: James N. Zehren, Bartlesville, Okla.
[73] Assignee: TRW Inc., Cleveland, Ohio
[21] Appl. No.: 759,990
[22] Filed: Jan. 17, 1977
[51] Int. Cl.² .................. H02K 5/22; H02G 15/00; F04B 39/00
[52] U.S. Cl. .................. 174/65 R; 174/23 R; 277/12; 310/71; 310/87; 417/422
[58] Field of Search .......... 174/23 R, 60, 65 R, 174/68 R, 70 R, 77 R, 155; 310/71, 87, 88, 89; 417/410, 422; 166/65; 277/4, 12; 339/94 R

[56] References Cited

U.S. PATENT DOCUMENTS

| | | | |
|---|---|---|---|
| 2,233,890 | 3/1941 | Hoover | 417/422 X |
| 2,283,117 | 5/1942 | Arutunoff | 417/410 |
| 2,722,892 | 11/1955 | French | 417/422 X |
| 3,170,520 | 2/1965 | Arutunoff | 166/65 |
| 4,062,551 | 12/1977 | Base | 339/94 R X |

FOREIGN PATENT DOCUMENTS

| | | | |
|---|---|---|---|
| 964695 | 5/1957 | Fed. Rep. of Germany | 174/60 |
| 676108 | 7/1952 | United Kingdom | 310/87 |

*Primary Examiner*—Laramie E. Askin
*Attorney, Agent, or Firm*—Shapiro and Shapiro

[57] ABSTRACT

The end of an electric cable for energizing the motor of a submergible pump is attached to the motor head by a device comprising a compression block receiving the cable conductors and a shield embracing the block and compressively clamping the block to the motor head. An adaptor sleeve mates with an opening in the motor head and a recess at one end of the compression block and is sealed in the opening and the recess. Better sealing against intrusion of well fluid and better protection of the sealed area are achieved.

19 Claims, 4 Drawing Figures

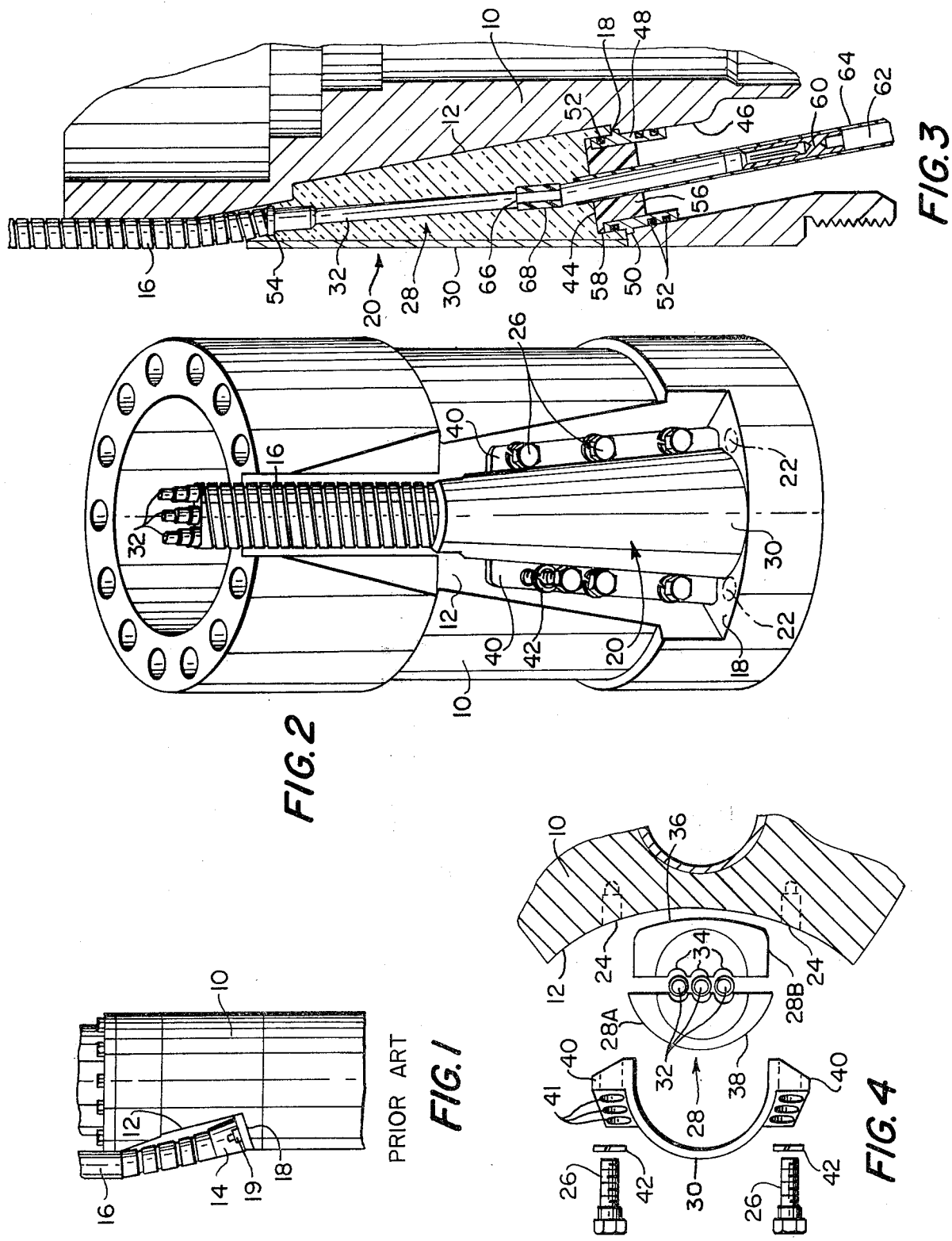

ATTACHMENT OF ELECTRIC CABLE TO SUBMERGIBLE PUMP MOTOR HEADS

BACKGROUND OF THE INVENTION

This invention is concerned with the attachment of an electric cable to the motor of a submergible pump and is more particularly concerned with improved attachment devices or "potheads", as they are known in the art.

To accommodate the energizing cable for the electric motor of one type of submergible pumping unit marketed by the assignee of the present invention, the generally cylindrical head of the motor housing has a depression at one side thereof which receives the pothead. Despite the provision of the depression in the motor head side wall, and the use of a flat armored cable section extending from the pothead, the pothead employed heretofore protrudes from the motor head and is susceptible to damage if bumped, as when the pumping unit is lowered into a well. Also, the sealing area available in the prior pothead for excluding well fluid from the motor is limited. A further disadvantage of the prior pothead has been the need for maintaining a stock of flat cable sections of different lengths and attached potheads as factory-supplied items. It has been impractical to assemble the potheads and cables in the field.

BRIEF DESCRIPTION OF THE INVENTION

It is accordingly a principal object of the invention to provide an improved device for attaching an electric cable to the motor head of a submergible pumping unit or the like.

A further object of the invention is to provide an improved pothead having better sealing, to exclude well fluid from a submergible motor, for example, and having better shielding and protection of the sealed area of the pothead.

Another object of the invention is to provide an improved pothead that can readily be assembled with electric cable in the field.

Briefly stated, in a preferred embodiment of the invention a device for attaching the end of an electric cable to a motor head or the like comprises a compression block having a passage for receiving each cable conductor and a shield shaped to embrace the block and having means for compressively clamping the block laterally against the motor head. More specifically, the block comprises two mating pieces of insulation with mating channels whch form each passage when the pieces are mated. The shield has marginal portions that are bolted to the motor head, and the entire attachment device is located in a depression of the motor head for protection. At one end of the depression an opening leads into the motor head. An adaptor sleeve is sealed into the opening and into a corresponding recess at one end of the compression block, and the cable conductors pass through a retainer plug in the sleeve. Excellent sealing is provided between the attachment device and the motor head and between the attachment device and the cable conductors. The device may be employed with an existing motor head with minimal modification of the motor head.

BRIEF DESCRIPTION OF THE DRAWINGS

The invention will be further described in conjunction with the accompanying drawings, which illustrate a preferred and exemplary embodiment and wherein:

FIG. 1 is a fragmentary side elevation view illustrating prior art attachment of an electric cable to the motor head of a submergible pumping unit;

FIG. 2 is a perspective view illustrating attachment of a cable to a motor head in accordance with the invention;

FIG. 3 is a fragmentary longitudinal sectional view illustrating the improved pothead in accordance with the invention, and FIG. 4 is an exploded view, partly in section, illustrating parts of the attachment device of the invention.

DETAILED DESCRIPTION OF THE INVENTION

A prior art technique for attaching an electric cable to the motor head of a submergible pumping unit is illustrated in FIG. 1. As shown, the motor head 10, which is generally cylindrical, has a depression 12 at one side thereof for receiving the pothead 14 at the end of an electric cable 16. One end of the depression 12 has a transverse surface 18 to which the pothead is attached by means of bolts 19 which extend perpendicular to surface 18 through flanges of the pothead. Further details of this type of device as well as additional details of the pumping unit are found, for example, in U.S. Pat. No. 2,283,117 to Arutunoff, assigned to the same assignee as the present invention.

It is apparent in FIG. 1 that the pothead of the prior art protrudes from the motor head side wall, despite the depression 12 and despite the use of a flat cable section 16, so that the pothead is susceptible to damage if bumped. Also, the pothead of the prior art has limited sealing area for excluding well fluid from the motor. Assembly of the attachment device and the cable in the field is not practical.

As shown in FIG. 2, the pothead 20 of the present invention may be empolyed with the same type of motor head 10 previously employed, with minimal modification. The bolt holes 22 formerly used for the attachment of the pothead are no longer used. Instead, as shown in FIG. 4, holes 24 are drilled into the side wall of depression 12 and are tapped to receive bolts 26. In addition to the bolts 26 and bolt holes 24, FIG. 4 illustrates principal parts of the attachment device of the invention, including a compression block 28 and a shield 30 which compressively clamps the block about conductors 32 of the cable as well as to the motor head 10.

The compression block is preferably formed in two pieces 28A and 28B of a suitable compressible insulating material, such as rubber or "Fo-mac". The two pieces mate to form a tapered block which fits within the depression 12 as shown in FIGS. 2 and 3. The parts of the block have longitudinal channels 34 which mate to form passages for reception of the conductrs 32 of the cable. Block part 28B has a side surface 36 curved to match the curvature of the side of depression 12, while block part 28A has a side surface 38 that is curved to match the curvature of the shield 30, which is preferably formed of metal and which has marginal portions or flanges 40 with bores 41 through which bolts 26 pass. The juxtaposed surfaces of the block parts are preferably flat. The side of the marginal portions 40 facing the bolt heads is preferably flat. The opposite side of the marginal portions is preferably tapered or contoured to engage the side of depression 12 securely. Lock washers 42 are preferably interposed between the bolts and flanges 40.

When the parts of the compression block 28 are mated, a recess 44 is formed at one end of the block, and when the attachment device is installed on the motor head, this recess is aligned with an opening 46 which leads from surface 18 to the interior of the motor head. An adaptor sleeve 48, preferably of metal, is sealed within recess 44 and opening 46. Sleeve 48 has a circumferential flange 50 which abuts an end of the compression block 28 and a shoulder surface surrounding opening 46. O-rings 52 seal the sleeve within recess 44 and opening 46.

The armor of the flat cable 16 terminates in a corresponding recess 54 in the compression block 28. If the armor extends to the end of the cable section to be attached to the motor head, sufficient armor is removed to expose the individually insulated conductors 32 of the cable.

The conductors enter the motor head via a retainer plug 56 within the sleeve 48. The retainer plug, which may be formed of "Synthane", for example, is preferably a two-piece plug with channels which mate to form passages for the cable conductors in the same manner as the compression block 28. One end of the plug has a circumferential flange 58 which abuts an end of sleeve 48 and the bottom of recess 44 in the compression block.

A conventional terminal 60 connects an exposed end of each conductor 32 with a corresponding end of each conductor 62 connected to the motor (not shown). A thin tube 64 of Teflon or similar material covers the conductor and the associated terminal and preferably extends through plug 56 and into the compression block 28. To prevent "wicking" by which fluid might pass along the conductors, a gap 66 is provided in the insulation of each conductor and is wrapped with tape 68 of Teflon or similar material at a conductor region lying within the compression block 28.

By virtue of the invention, the end of an electric cable is securely attached to the motor head. Highly effective sealing is provided between the parts of the attachment device and the motor head (by means of multiple O-rings 52 and the compression of block 28 laterally against the motor head) and highly effective sealing of the cable conductors in the attachment device is provided (especially by compression of the compression block material around the conductors). The sealing area is completely shielded against damage. Moreover, the attachment device is readily assembled with the end of the cable section in the field.

While a preferred form of the invention has been shown and described, it will be apparent to those skilled in the art that changes can be made in this embodiment without departing from the principles and spirit of the invention, the scope of which is defined in the appended claims.

The invention claimed is:

1. Apparatus comprising a motor head having a depression at one side thereof and having an opening into the motor head at one end of the depression, and a device for attaching an end of a multiconductor electric cable to the motor head, said device including a compression block having passages for sealing corresponding cable conductors therein when the block is compressed, said block being shaped to be received in said recess with said passages extending toward said opening, means for compressively clamping the block to said side of the head in the depression with one end of the passages connected to said opening, and means for providing a seal about the connection of the passages with said opening.

2. Apparatus in accordance with claim 1, wherein the block comprises two mating pieces with mating channels which form each passage when the pieces are mated.

3. Apparatus in accordance with claim 1, wherein the block is formed of compressible insulating material.

4. Apparatus in accordance with claim 1, wherein a side of the block remote from said side of the head is curved and the clamping means comprises a shield having a matching curvature.

5. Apparatus in accordance with claim 4, wherein the shield has marginal portion through which bolts are threaded into said side of the head.

6. Apparatus in accordance with claim 1, wherein the means providing said seal comprises a sleeve extending from one end of the block into the opening and means for sealing the sleeve into the opening.

7. Apparatus in accordance with claim 6, wherein the block has a recess at said one end aligned with the opening, and wherein the sleeve extends within the recess and is sealed therein.

8. Apparatus in accordance with claim 7, further comprising a retainer plug for supporting conductors in the sleeve.

9. Apparatus in accordance with claim 8, wherein the plug comprises two pieces for embracing each conductor.

10. Apparatus in accordance with claim 9, wherein the sleeve has a flange abutting said one end of the block and abutting a surface of the head about the opening, and wherein the plug has a flange abutting an end of the sleeve and abutting the bottom of the block recess.

11. Apparatus in accordance with claim 10, further comprising a multi-conductor cable with conductors sealed in said passages, respectively, each conductor having an end connected to a corresponding conductor end in said head by terminal means, and an insulating sleeve surrounding each terminal means and each of the associated conductor ends.

12. Apparatus in accordance with claim 11, wherein each conductor is insulated and has a circumferential gap in its insulation is said block that is filled with tape wound in the gap for preventing wicking.

13. A device for attaching an end of a multi-conductor electric cable to the head of a motor or the like having a depression at one side thereof and having an opening into the head at one end of the depression, said device comprising a compression block having passages therethrough for receiving corresponding cable conductors and for sealing the conductors therein when the block is compressed, said block being shaped to be received in said recess with said passages extending toward said opening, means for compressively clamping the block to said side of the head in the depression with one end of the passages positioned for connection to said opening, and means for providing a seal about said connection, the last-mentioned means comprising a sleeve adapted to fit said opening and having means for sealing the sleeve in the opening.

14. A device in accordance with claim 13, wherein the block comprises two mating pieces with mating channels which form each passage when the pieces are mated.

15. A device in accordance with claim 13, wherein the block is formed of compressible insulating material.

16. A device in accordance with claim 13, wherein the block has a recess at one end, and wherein the sleeve is adapted to extend within the recess and to be sealed therein.

17. A device in accordance with claim 16, further comprising a retainer plug for supporting conductors in the sleeve.

18. A device in accordance with claim 17, wherein the plug comprises two pieces adapted to embrace each conductor.

19. A device in accordance with claim 13, wherein the clamping means is a shield which is shaped to cover the block.

* * * * *